US011113325B2

(12) United States Patent
Mishra et al.

(10) Patent No.: US 11,113,325 B2
(45) Date of Patent: Sep. 7, 2021

(54) TECHNIQUES FOR AUTOMATICALLY ANALYZING A TRANSCRIPT AND PROVIDING INTERACTIVE FEEDBACK PERTAINING TO INTERACTIONS BETWEEN A USER AND OTHER PARTIES

(71) Applicant: GetGo, Inc., Boston, MA (US)

(72) Inventors: Nilesh Mishra, Goleta, CA (US); Alexander John Huitric, Goleta, CA (US); Ashish V. Thapliyal, Santa Barbara, CA (US); Christfried H. Focke, Santa Barbara, CA (US)

(73) Assignee: GetGo, Inc., Boston, MA (US)

( * ) Notice: Subject to any disclaimer, the term of this patent is extended or adjusted under 35 U.S.C. 154(b) by 397 days.

(21) Appl. No.: 15/702,180

(22) Filed: Sep. 12, 2017

(65) Prior Publication Data
US 2019/0079997 A1  Mar. 14, 2019

(51) Int. Cl.
*G06F 16/33* (2019.01)
*G06F 16/335* (2019.01)
*G06F 16/338* (2019.01)

(52) U.S. Cl.
CPC ........ *G06F 16/3344* (2019.01); *G06F 16/337* (2019.01); *G06F 16/338* (2019.01)

(58) Field of Classification Search
None
See application file for complete search history.

(56) References Cited

U.S. PATENT DOCUMENTS

| 6,138,098 | A | * | 10/2000 | Shieber | G06F 17/271 |
| | | | | | 704/257 |
| 9,202,469 | B1 | | 12/2015 | Moorjani et al. | |
| 9,400,833 | B2 | | 7/2016 | Thapliyal | |
| 9,569,428 | B2 | | 2/2017 | Thapliyal | |
| 9,703,766 | B1 | * | 7/2017 | Kyre | G06K 15/1814 |
| 10,325,022 | B1 | * | 6/2019 | Sullivan | G06F 8/456 |
| 2007/0061720 | A1 | * | 3/2007 | Kriger | G06F 17/214 |
| | | | | | 715/700 |
| 2009/0119275 | A1 | * | 5/2009 | Chen | G06Q 30/02 |
| 2010/0235353 | A1 | * | 9/2010 | Warnock | G06F 16/338 |
| | | | | | 707/723 |
| 2016/0078014 | A1 | * | 3/2016 | Avasarala | G06F 17/241 |
| | | | | | 704/9 |

(Continued)

OTHER PUBLICATIONS

Marina Litvak; Graph-Based Keyword Extraction for Single-Document Summarization; Creative Commons; 2008; pp. 17-23 (Year: 2008).*

(Continued)

*Primary Examiner* — Mariela Reyes
*Assistant Examiner* — Jermaine A Mincey
(74) *Attorney, Agent, or Firm* — BainwoodHuang

(57) ABSTRACT

Techniques are provided to allow a user to interact with a computer to automatically analyze a transcript and provide interactive feedback pertaining to interactions between the user and other parties. This may be accomplished by dividing the transcript into text sequences, such as sentences, and matching each text sequence against a set of rules that define patterns that relate text sequences to particular characteristic categories. These matches can be further scored and ranked to allow particular text sequences to be interactively displayed to the user in response to selection of a particular categorization.

15 Claims, 5 Drawing Sheets

(56) References Cited

U.S. PATENT DOCUMENTS

| | | |
|---|---|---|
| 2017/0154030 A1 | 6/2017 | Moorjani et al. |
| 2018/0081704 A1* | 3/2018 | Hirt .................... G06F 9/45558 |
| 2018/0232460 A1* | 8/2018 | Goryachev ......... G06F 16/9535 |

OTHER PUBLICATIONS

Thapliyal, et al., "Real Time Learning of Text Classification Models for Fast and Efficient Labeling of Training Data and Customization," U.S. Appl. No. 15/661,158, filed Jul. 27, 2017.

Clark, et al., "Generating a Consistently Labeled Training Dataset by Automatically Generating and Displaying a Set of Most Similar Previously-Labeled Texts and Their Previously Assigned Labels for Each Text That is Being Labeled for the Training Dataset," U.S. Appl. No. 15/659,888, filed Jul. 26, 2017.

* cited by examiner

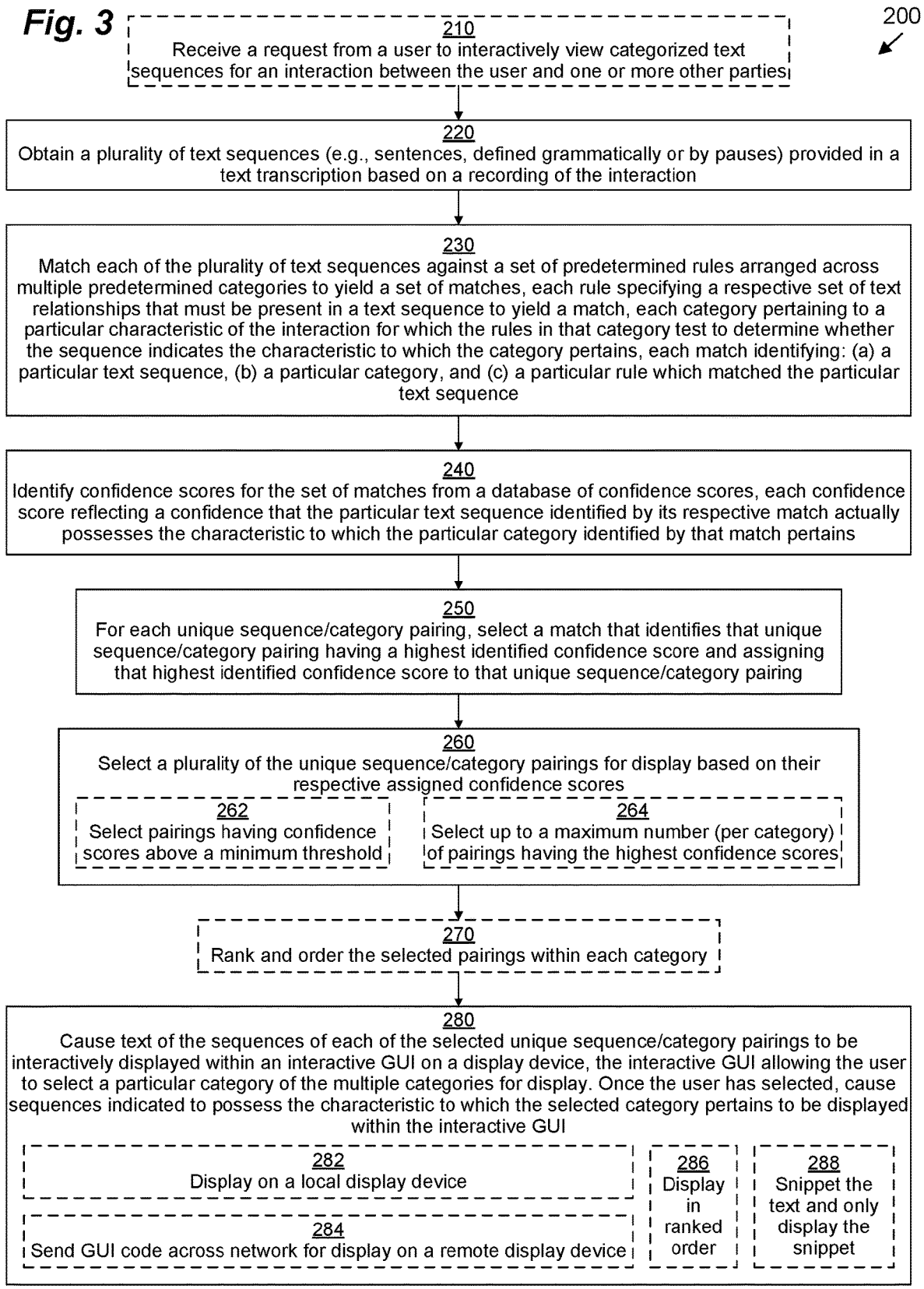

TECHNIQUES FOR AUTOMATICALLY ANALYZING A TRANSCRIPT AND PROVIDING INTERACTIVE FEEDBACK PERTAINING TO INTERACTIONS BETWEEN A USER AND OTHER PARTIES

BACKGROUND

Individuals often have a need to interact. When not physically co-located, telephones as well as conferencing software running on networked computers may allow them to conduct a conversation or presentation remotely. An individual may record these conversations or presentations using the conferencing software. An individual may also record a conversation or presentation using a computing device (e.g., a smart phone) even when it is not being conducted over a network. If the individual wishes to later have easy access to the contents of the conversation or presentation, the recording may be transcribed, either by a person or by computer transcription software. Users may then search the transcription as needed.

SUMMARY

Although recording and transcribing conversations and presentations allows for easy searching if the user knows what words to search for, it can be difficult for users to evaluate the conversation or presentation for effectiveness and other qualities.

Thus, improved techniques allow a user to interact with a computer to automatically analyze a transcript and provide interactive feedback pertaining to interactions between the user and other parties. This may be accomplished by dividing the transcript into text sequences, such as sentences, and comparing each text sequence against a set of rules that define patterns that relate text sequences to particular characteristic categories. These matches can further be scored and ranked to allow particular text sequences to be interactively displayed to the user in response to selection of a particular categorization.

One embodiment is directed to a method of interactively communicating with a user to generate automated feedback pertaining to the user's interactions with other parties, performed by a computing device. The method includes (1) obtaining a plurality of text sequences provided in a text transcription, the text transcription based on a recording of an interaction, (2) matching each of the plurality of text sequences against a set of predetermined rules arranged across multiple predetermined categories to yield a set of matches, each rule specifying a respective set of text relationships that must be present in a text sequence to yield a match, each category pertaining to a particular characteristic of the interaction for which the rules in that category test to determine whether the sequence indicates the characteristic to which the category pertains, each match identifying (a) a particular text sequence of the plurality of text sequences, (b) a particular category of the multiple predetermined categories, and (c) a particular rule which matched the particular text sequence, (3) identifying confidence scores for the set of matches from a database of confidence scores, each confidence score reflecting a confidence that the particular text sequence identified by its respective match actually possesses the characteristic to which the particular category identified by that match pertains, (4) for each unique sequence/category pairing, selecting a match that identifies that unique sequence/category pairing having a highest identified confidence score and assigning that highest identified confidence score to that unique sequence/category pairing, (5) selecting a plurality of the unique sequence/category pairings for display based on their respective assigned confidence scores, and (6) causing text of the sequences of each of the selected unique sequence/category pairings to be interactively displayed within a graphical user interface (GUI) on a display device, the GUI allowing the user to select a particular category of the multiple categories for display, wherein once the user has selected a selected category for display, causing text of the sequences of each of the selected unique sequence/category pairings to be interactively displayed within the GUI on the display device includes causing sequences indicated to possess the characteristic to which the selected category pertains to be displayed within the GUI on the display device. Other embodiments are directed to corresponding apparatuses, computer program products, and systems for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. In the accompanying drawings.

FIG. 3 is a flowchart depicting example methods according to various embodiments.

DETAILED DESCRIPTION

Embodiments of the invention will now be described. It is understood that such embodiments are provided by way of example to illustrate various features and principles of the invention, and that the invention hereof is broader than the specific example embodiments disclosed.

Improved techniques are provided to allow a user to interact with a computer to automatically analyze a transcript and provide interactive feedback pertaining to interactions between the user and other parties. This may be accomplished by dividing the transcript into text sequences, such as sentences, and matching each text sequence against a set of rules that define patterns that relate text sequences to particular characteristic categories. These matches can be further scored and ranked to allow particular text sequences to be interactively displayed to the user in response to selection of a particular categorization.

Figure 1:
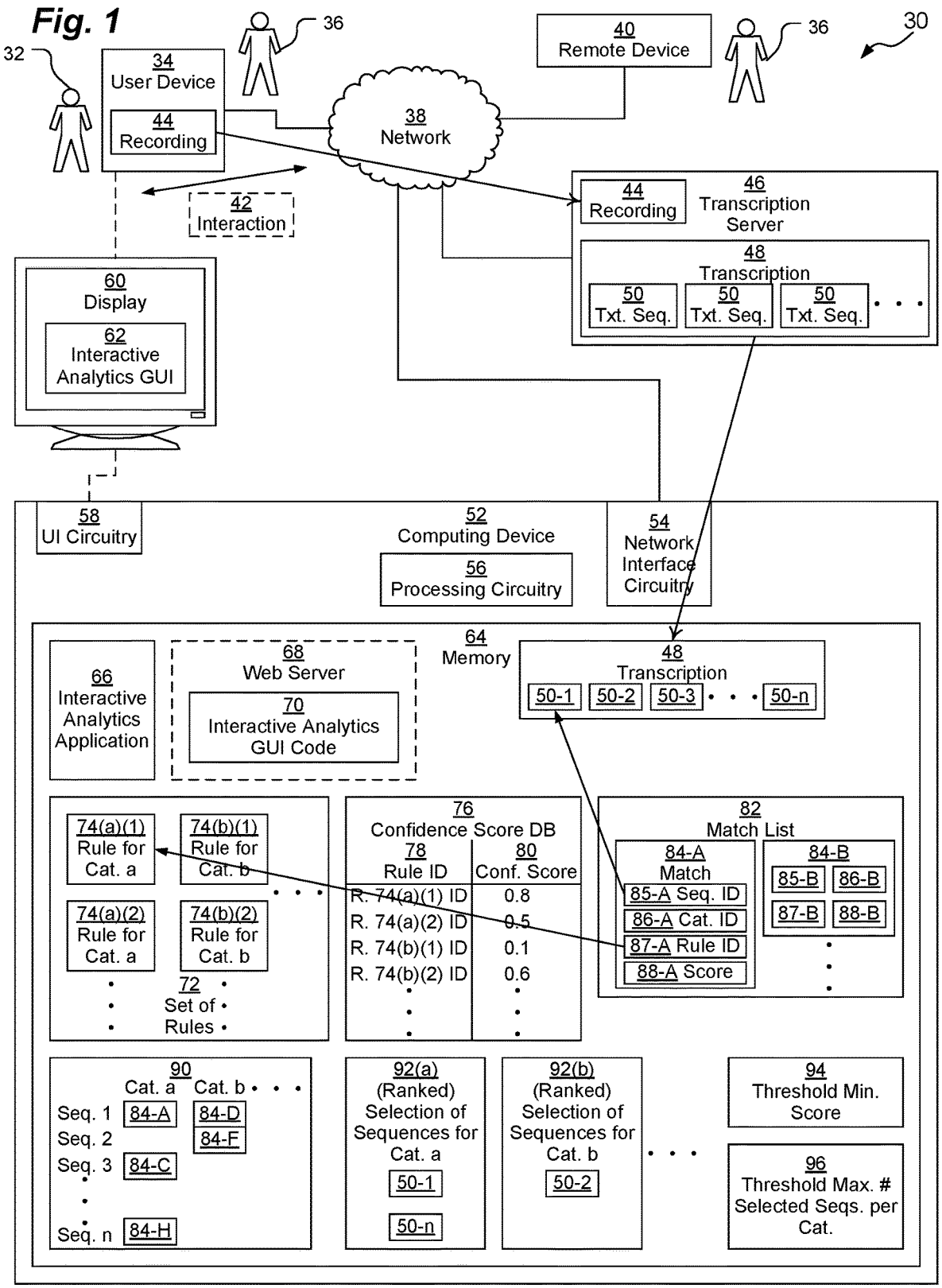
FIG. 1 is a block diagram depicting a logical view of an example system and apparatus according to various embodiments.

FIG. 1 shows an example environment 30 in which embodiments of the improved techniques hereof can be practiced. Here, a human user 32 interacts with one or more other parties 36 using a user device 34 that makes a recording 44 of the interaction 42 between the user 32 and the one or more other parties 36. The interaction 42 may be a bidirectional interaction such as a conference or a unidirectional (or mostly unidirectional) interaction such as a presentation. Interaction 42 includes an audio recording of speech by the parties 32, 36. In some embodiments, the interaction 42 may be conducted across a network 38 with a person 36 using a remote device 40. In some embodiments, the interaction 42 is local between the users 32, 36 both within recording range of the user device 34 (e.g., a smart phone). In some embodiments, several parties 32, 36 may be located adjacent to the user device 34 while a teleconference is conducted with yet another user 36 at remote device 40.

Transcription server 46 receives a copy of the recording 44 over network 38 and creates a transcription 48 of the interaction 42. In some embodiments, transcription server 46 may also divide the transcription into a set of non-overlapping text sequences 50 (e.g., sentences). For example, transcription server 46 may look for pauses exceeding a threshold length of time (e.g., 0.5 seconds or 1 second) within the recording 44, breaking up the text sequences 50 between those pauses. In another example, text transcription server may grammatically analyze the transcription 48 using a parser to identify sentences or other grammatical structures (e.g., phrases or clauses) and to set each such identified sentence or other grammatical structure as a separate text sequence 50. In other embodiments, transcription server 46 does not divide the transcription 48 into text sequences 50, that job being instead done by another entity (e.g., computing device 52).

User device 34, remote device 40, and transcription server 46 may be any kinds of computing devices, such as, for example, personal computers, workstations, servers, enterprise servers, laptops, tablets, smartphones, etc.

The network 38 may be any type of network or combination of networks, such as a local area network (LAN), a wide area network (WAN), the Internet, and/or some other type of network or combination of networks, for example. The user device 34, remote devices 40, and transcription server 46 may connect to the network 38 using various technologies, such as Ethernet, Token Ring, or Wi-Fi, for example.

Computing device 52 connects to network 38 as well. In some embodiments, computing device 52 may also function as user device 32, a remote device 40, or transcription server 46. User 32 or another person may communicate with computing device 52 in order to request analysis of transcript 48 and interactive feedback pertaining to the interaction 42 between the user 32 and one or more of the other parties 36. In one embodiment, user 32 (or other person, hereinafter omitted) communicates with computing device 52 remotely over network 38 by interacting with a web page provided by computing device 52 via a web browser operating on the user device 34 and displayed on a display device 60 connected to the user device 34. In another embodiment, user 32 communicates directly with computing device by operating user interface (UI) devices (including display device 60 as well as user input devices, not shown) connected to UI circuitry 58 of the computing device 52. Display device 60 may be any kind of device capable of displaying images to user 32. Display device 60 may be, for example, a CRT, LCD, plasma, or LED monitor or embedded display screen. User input devices allow user 32 to directly interact with the computing device 52 or the user device 34, depending on the embodiment. User input devices may include, for example, a keyboard, keypad, mouse, trackpad, trackball, touch-sensitive screen, etc.

Computing device 52 may be any kind of computing device, such as, for example, a personal computer, a workstation, a server, an enterprise server, a laptop, a tablet, a smartphone, etc. Typically, computing device 52 is a server. Computing device 52 includes processing circuitry 56, network interface circuitry 54, memory 64, and interconnection circuitry (not depicted). Computing device 52 may also include UI circuitry 58 to connect to display device 60 and user input circuitry in embodiments in which user 32 communicates directly with computing device 52.

Processing circuitry 56 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 54 may include one or more Ethernet cards, cellular modems, cable modems, DSL modems, Wireless Fidelity (Wi-Fi) wireless networking adapters, and other devices for connecting to a network (e.g., network 38), such as a LAN, WAN, cable system, DSL system, cellular data network, etc.

UI circuitry 58 may connect to one or more UI devices (e.g., user input devices and display device 60), which allow a user (e.g., user 32) to directly interact with the computing device 52. UI circuitry 58 may include, for example, a graphics adapter for connecting to a display device 60 and one or more communications buses. These communications buses may connect to, for example, a keyboard, mouse, trackpad, etc.

The memory 64 may include both volatile memory (e.g., random access memory, RAM), and non-volatile memory, such as one or more read-only memories (ROMs), disk drives, solid-state drives, and the like. At a minimum, memory 64 includes system memory, typically RAM. The processing circuitry 56 and the memory 64 together form control circuitry, which is constructed and arranged to carry out various methods and functions as described herein, e.g., alone or in coordination with similar control circuitry on another data storage system. Also, the memory 64 includes a variety of software constructs realized in the form of executable instructions. When the executable instructions are run by the processing circuitry 56, the processing circuitry 56 is caused to carry out the operations of the software constructs. Although certain software constructs are specifically shown and described, it should be understood that the memory 64 typically includes many other software constructs, which are not shown, such as an operating system and various applications, processes, and daemons. Applications configured to run on processing circuitry 56 when stored in non-transitory form, either in the volatile portion or the non-volatile portion of memory 64 or both, form a computer program product. The processing circuitry 56 running one or more of these applications thus forms a specialized circuit constructed and arranged to carry out the various processes described herein.

Memory 64 stores an interactive analytics application 66 as well as interactive analytics GUI code 70. The interactive analytics GUI code 70 is configured to cause an interactive analytics GUI 62 to be displayed on display device 60. In some embodiments, interactive analytics GUI code 70 is sent by a web server application 68 also running on the computing device 52 to the user device 34 over network 38 so that the interactive analytics GUI code 70 can be executed by a web browser (not depicted) running on the user device 34 to render interactive analytics GUI 62 on display device 60. In other embodiments, interactive analytics GUI code 70 runs locally on the computing device 52 to cause the interactive analytics GUI 62 to be rendered on display device 60 via UI circuitry 58.

Memory 64 also stores a copy of transcription 58, including text sequences 50 (depicted as text sequences 50-1, 50-2, 50-3, . . . , 50-$n$), a set 72 of rules 74, confidence score database (DB) 76, match list 82, a category/sequence mapping 90, a set of selections 92 of text sequences 50 (depicted as selections 92($a$), 92($b$), . . . ), a threshold minimum score 94, and a threshold maximum number 96 of selected sequences per category.

Set 72 of rules 74 define patterns that map text sequences to particular predetermined categories, each category pertaining to a particular characteristic that may be found in an interaction 42. One example category relates to a characteristic of discussing Next Steps. Another example category relates to a characteristic of Humility. The set 72 of rules 74 may be organized by category, Thus, for example, rules 74($a$)(1) and 74($a$)(2) each specify a text relationship that must be present in a text sequence 50 to indicate the characteristic of category a (e.g., Next Steps), and rules 74($b$)(1) and 74($b$)(2) each specify a text relationship that must be present in a text sequence 50 to indicate the characteristic of category b (e.g., Humility).

Confidence score DB 76 maps rule identifiers (IDs) 78 to confidence scores 80 that assess how likely a particular text sequence 50-$x$ that has been mapped to a particular category y by a particular rule 74($y$)($z$) actually possesses the characteristic to which the particular category y identified by that rule 74($y$)($z$) pertains. Thus, for example, as depicted, rule 74($a$)(1) has a confidence score 80 of 0.8, meaning that 80% of the time that rule 74($a$)(1) matches against a text sequence 50, that text sequence 50 is expected to actually possess the characteristic of Next Steps. Similarly, for example, as depicted, rule 74($a$)(2) has a confidence score 80 of 0.5, meaning that 50% of the time that rule 74($a$)(2) matches against a text sequence 50, that text sequence 50 is expected to actually possess the characteristic of Next Steps. As another example, as depicted, rule 74($b$)(1) has a confidence score 80 of 0.1, meaning that 10% of the time that rule 74($b$)(1) matches against a text sequence 50, that text sequence 50 is expected to actually possess the characteristic of Humility. As another example, as depicted, rule 74($b$)(2) has a confidence score 80 of 0.6, meaning that 60% of the time that rule 74($b$)(2) matches against a text sequence 50, that text sequence 50 is expected to actually possess the characteristic of Humility.

Match list 82 includes a set of matches 84 (depicted as matches 84-A, 84-B, . . . ). Each match 84 represents a particular rule 74 matching against a particular text sequence 50, thereby demonstrating that that text sequence 50 indicates the characteristic of a particular category. Each match 84-X includes a respective sequence identifier (ID) 85-X, category ID 86-X, and rule ID 87-X. Thus, for example, as depicted, match 84-A includes a sequence ID 85-A that identifies text sequence 50-1, a category ID 86-A that identifies category a (e.g., Next Steps), and a rule ID 87-A that identifies rule 74($a$)(1). Each match 84-X may also include a score 88-X drawn from the confidence score DB 76, although, in some embodiments, this may be omitted as the score 88-X may be obtained with simple reference to the confidence score DB 76. Thus, for example, match 84-A has a score 88-A of 0.8 since that is the confidence score 80 associated with rule 74($a$)(1). As another example, assume that within match 84-B, sequence ID 85-B also identifies text sequence 50-1, category ID 86-B also identifies category a (e.g., Next Steps), and rule ID 87-B identifies rule 74($a$)(2).

Category/sequence mapping 90 represents a set of best matches 84 (if any) for each possible pairing of categories and text sequences 50. Thus, although matches 84-A and 84-B both have respective category IDs 86 identifying category a, since the score 88-A for match 84-A is 0.8 and the score 88-B for match 84-B is only 0.5, only match 84-A is mapped to the pairing of text sequence 50-1 and category a. In addition, as depicted, there is no match 84 that is mapped to the pairing of text sequence 50-2 and category a because there were no matches for any of the rules 74($a$) of category a against text sequence 50-2. As depicted, match 84-C is the best match for the pairing of text sequence 50-3 and category a and match 84-H is the best match for the pairing of text sequence 50-$n$ and category a. As further depicted, match 84-D is the best match for the pairing of text sequence 50-1 and category b and match 84-F is the best match for the pairing of text sequence 50-2 and category b. The pairings of category b with both text sequences 50-3 and 50-$n$ have no matches.

Each per category selection 92 of text sequences 50 includes a selection of text sequences 50 identified by a subset of the matches 84 for a particular category (see category/sequence mapping 90). As depicted, selection 92($a$) for category a includes text sequences 50-1 and 50-$n$ (corresponding to matches 84-A and 84-H, but excluding match 84-C in this example). As depicted, selection 92($b$) for category b includes text sequence 50-2 (corresponding to match 84-F, but excluding match 84-D in this example).

There are various ways in which this selection may be done. In one embodiment, the respective text sequences 50 for all matches 84 in the category/sequence mapping 90 under a particular category are selected as long as the respective scores 88 for those matches 84 exceed the threshold minimum score 94 stored in memory 64. In another embodiment, the respective text sequences 50 for all matches 84 in the category/sequence mapping 90 under a particular category are selected as long as the number of such matches 84 does not exceed the threshold maximum number 96 of selected sequences per category, also stored in memory 64. If, however, the number does exceed the threshold maximum 96, then the text sequences 50 from only the matches 84 having the highest respective scores 88 are included (there being the threshold maximum number 96 of selected text sequences 50).

In some embodiments, the text sequences 50 within each selection 92 may be ranked in order from highest to lowest corresponding scores 88.

Interactive analytics GUI 62 is configured to interactively display on the display device 60 the text sequences 50 of one or more of the selections 92.

Figure 2A:
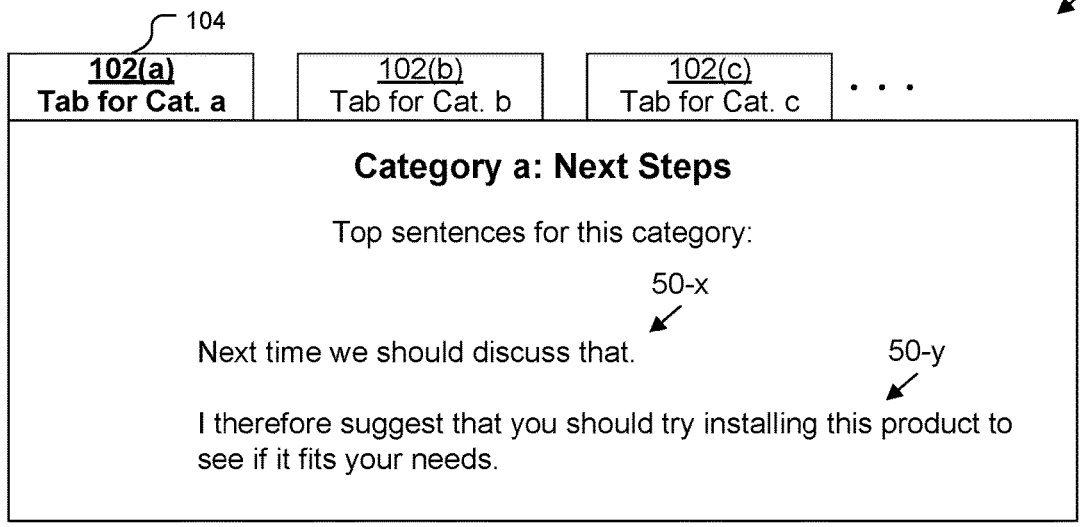
FIGS. 2A and 2B are block diagrams depicting an example interactive graphical user interfaces in response to different user inputs in accordance with various embodiments.

FIG. 2A depicts an example state 162 of interactive analytics GUI 62. As depicted, the interactive analytics GUI 62 displays several tabs 102 that allow the user 32 to choose between several different categories. For example, tab 102($a$) allows the user 32 to select category a, tab 102($b$) allows the user 32 to select category b, and tab 102($c$) allows the user 32 to select category c. As depicted in FIG. 2A, the user 32 has selected tab 102($a$) as the active tab 104. Thus, the interactive analytics GUI 62 displays results for category a, displaying text sequences 50 identified by selection 92($a$) for that category (e.g., Next Steps, as depicted). As depicted, two sequences 50-$x$, 50-$y$ are depicted in connection with category a.

Figure 2B:
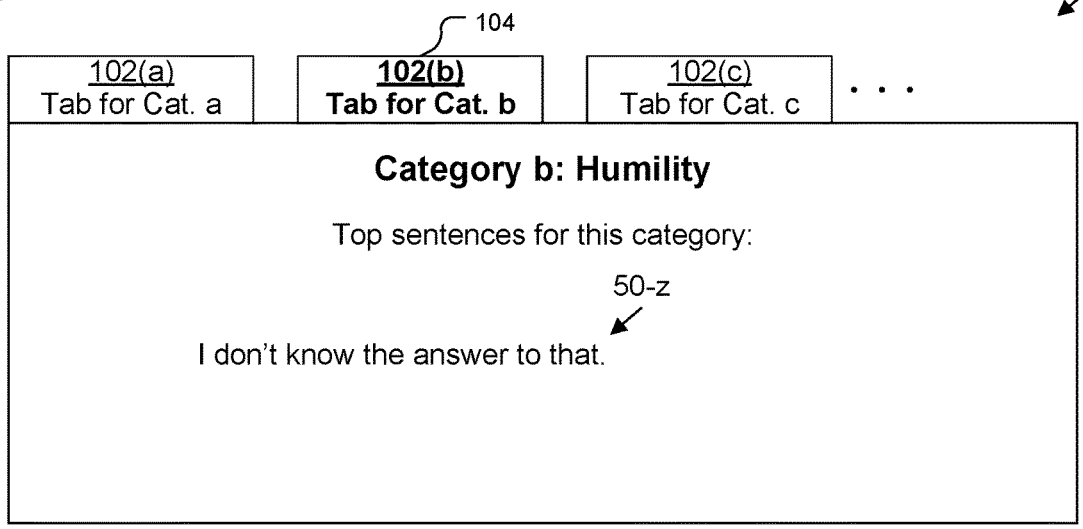

FIG. 2B depicts an alternate example state 162' of interactive analytics GUI 62 in which the user 32 has changed the active tab 104 to instead be tab 102($b$) to indicate category b. Thus, the interactive analytics GUI 62 now displays results for category b, displaying text sequences 50 identified by selection 92(*b*) for that category (e.g., Humility, as depicted). As depicted, only one sequences 50-*z* is depicted in connection with category b.

FIG. 3 depicts an example method 200 for a computing device 52 to allow a user 32 to interact with the computing device 52 to automatically analyze a transcription 48 and provide interactive feedback pertaining to interactions 42 between the user 32 and other parties 36.

Method 200 is performed by interactive analytics application (IAA) 66 operating on a computing device 52. It should be understood that any time a piece of software (e.g., IAA 66, interactive analytics GUI code 70, web server 68, etc.) is described as performing a method, process, step, or function, in actuality what is meant is that a computing device (e.g., computing device 52, user device 34, remote device 40, transcription server 46, etc.) on which that piece of software is running performs the method, process, step, or function when executing that piece of software on its processing circuitry 56. It should be understood that, in some embodiments, one or more of the steps or sub-steps may be omitted. Similarly, in some embodiments, one or more steps or sub-steps may be combined together or performed in a different order.

In optional step 210, IAA 66 receives a request from a user 32 to interactively view categorized text sequences 50 for an interaction 42 between the user 32 and one or more other parties 36. In other embodiments, step 210 may instead occur just prior to step 280, while in other embodiments, step 210 is omitted entirely, the rest of method 200 being performed automatically in response to transcription server 46 sending the transcription 48 to the computing device 52 (which may be done, for example, immediately upon the transcription server receiving the recording 44 from the user device 34 and completing transcribing the recording 44).

In step 220, IAA 66 obtains a plurality of text sequences 50 (e.g., sentences, defined grammatically or by pauses) provided in a text transcription 48 based on a recording 44 of the interaction 42. In some embodiments, IAA 66 requests that the transcription server 46 send it the transcription 48 and/or the text sequences 50 in response to receiving the request of step 210, while, in other embodiments, transcription server 46 itself initiates the sending of the transcription 48 and/or the text sequences 50 upon becoming available. In some embodiments, transcription server 46 only sends the transcription 48 to the computing device 52 without dividing it into text sequences—in these embodiments, the computing device 52 itself divides the transcription 48 into text sequences 50. In other embodiments, the transcription server 46 sends the individual text sequences 50 to the computing device 52, either by sending the entire transcription 48 together with a list of divisions between the text sequences 50 or by sending the text sequences 50 individually.

In step 230, IAA 66 matches each of the plurality of text sequences 50 against a set 72 of predetermined rules 74 arranged across multiple predetermined categories (e.g., categories a, b, ... ), each rule 74 specifying a respective set of text relationships that must be present in a text sequence 50 to satisfy that rule 74, each category pertaining to a particular characteristic (e.g., Next Steps, Humility, etc.) of the interaction 42 for which the rules 74 in that category test to determine whether the sequence 50 indicates the characteristic to which the category pertains, yielding a set 82 of matches 84, each match 84 identifying: (a) a particular text sequence 50, (b) a particular category, and (c) a particular rule 74 which matched the particular text sequence 50, thereby demonstrating that the particular text sequence 50 indicates the characteristic to which the particular category pertains. The rules 74 may take the form of a set of at least two words and a proximity, so, in order to match a rule, all of the specified words must be present in a text sequence within the given proximity of each other. For example, rule 74(*a*)(1) may state that the words "suggest" and "should" must appear within five words of each other in order to indicate category a relating to the characteristic of Next Steps. As another example, rule 74(*a*)(2) may state that the words "install*" (the asterisk indicating any extension of the word "install" such as "install," "installs," "installed," and "installing") and "product" must appear within seven words of each other in order to indicate category a relating to the characteristic of Next Steps. As another example, rule 74(*b*)(1) may state that the words "I" and "think" must appear within two words of each other in order to indicate category b relating to the characteristic of Humility. As another example, rule 74(*b*)(2) may state that the word "I" and the phrase "don't know" must appear within three words of each other (or alternatively that the three words "I" and "don't" and "know" must appear within four words from start to finish) in order to indicate category b relating to the characteristic of Humility. In some embodiments, a rule 74 may also include one or more words that may not appear in proximity to the other words—if such a negative word does appear in such proximity, then that rule 74 will not match. For example, rule 74(*b*)(1) may state that the word "not" may not appear within two words of the positive words "I" and "think."

In step 240, IAA 66 identifies confidence scores 88 for the set 82 of matches 84 from a DB 76 of confidence scores 80, each confidence score 88 reflecting a confidence that the particular text sequence 50 identified by its respective match 84 actually possesses the characteristic to which the particular category identified by that match 84 pertains. In some embodiments, IAA actually stores the identified scores 88 as part of the matches 84, while, in other embodiments, the scores 80 are just identified from the confidence score DB 76 but not stored within matches 84.

In step 250, for each unique sequence/category pairing, IAA 66 selects a match 84 (if any exists) that identifies that unique sequence/category pairing having a highest identified confidence score 88 and assigns that highest identified confidence score 88 to that unique sequence/category pairing. In one embodiment, IAA 66 creates mapping 90 as part of step 250.

In step 260, IAA 66 selects a plurality of the unique sequence/category pairings for display based on their respective assigned confidence scores 88. In one embodiment, IAA creates selections 92 as part of step 260.

In some embodiments, IAA 66 performs step 260 by performing sub-step 262. In sub-step 262, IAA 66 selects pairings having confidence scores 88 above a minimum threshold (e.g., minimum threshold score 94). In one example embodiment, the minimum threshold score 94 is 0.2.

In other embodiments, IAA 66 performs step 260 by performing sub-step 264. In sub-step 264, IAA 66 selects up to a maximum number (e.g., threshold maximum number 96) per category of pairings having the highest respective confidence scores 88. In one example embodiment, the threshold maximum number 96 is ten.

In some embodiments, either after step 260 or in conjunction with step 260, IAA 66 performs optional step 270. In step 270, IAA 66 ranks and orders the selected pairings within each category from highest to lowest respective scores 88.

In some embodiments, steps 220-260 or 220-270 are performed shortly after user 32 makes the recording 44 of interaction 42 and transcription server 46 transcribes it to create transcription 48, but step 280 is only performed after receiving a request from user 32 such as in step 210.

In step 280, IAA 66 causes text of the sequences 50 of each of the selected unique sequence/category pairings (e.g., selected within selections 92) to be interactively displayed within interactive analytics GUI 62 on display device 60, the interactive analytics GUI 62 allowing the user 32 to select a particular category of the multiple categories for display. Once the user 32 has selected, IAA 66 cause sequences 50 (or portions thereof) indicated to possess the characteristic to which the selected category pertains to be displayed within the interactive analytics GUI 62. This may include separately displaying text of the respective selected sequences 50 for each category depending on which tab 102 is selected (see FIGS. 2A and 2B).

In some embodiments, IAA 66 performs step 280 by performing sub-step 282, while in other embodiments, IAA 66 performs step 280 by performing sub-step 284.

In sub-step 282, IAA 66 displays the interactive analytics GUI 62 directly on local display device 60 via UI circuitry 58. In these embodiments, IAA 66 may directly execute interactive analytics GUI code 70 on processing circuitry 56.

In sub-step 284, IAA 66 sends the interactive analytics GUI code 70 across network 38 (e.g., via network interface circuitry 54) for rendering by the user device 34 and display on remote display device 60. In one such embodiment, IAA 66 generates the interactive analytics GUI code 70 (e.g., markup code such as XML, HTML, dynamic HTML, etc.) and directs web server 68 to send it to a web browser running on the user device 34 for execution.

In some embodiments, as part of step 280, IAA 66 performs sub-step 286. In sub-step 286, IAA 66 causes the text of the selected sequences for a particular category to be displayed in the ranked order generated in step 270.

In some embodiments, as part of step 280, IAA 66 performs sub-step 288. In sub-step 288, instead of displaying the entirety of each text sequence 50 that was selected, IAA 66 first performs a snippeting operation on each of the selected text sequences 50 and then displays a snippet of each selected text sequence 50. A snippet is a subset of a text sequence, which, depending on the embodiment and the particular text sequence 50, may include the entirety of the text sequence or it may include less than the entirety of the text sequence.

Figure 4:
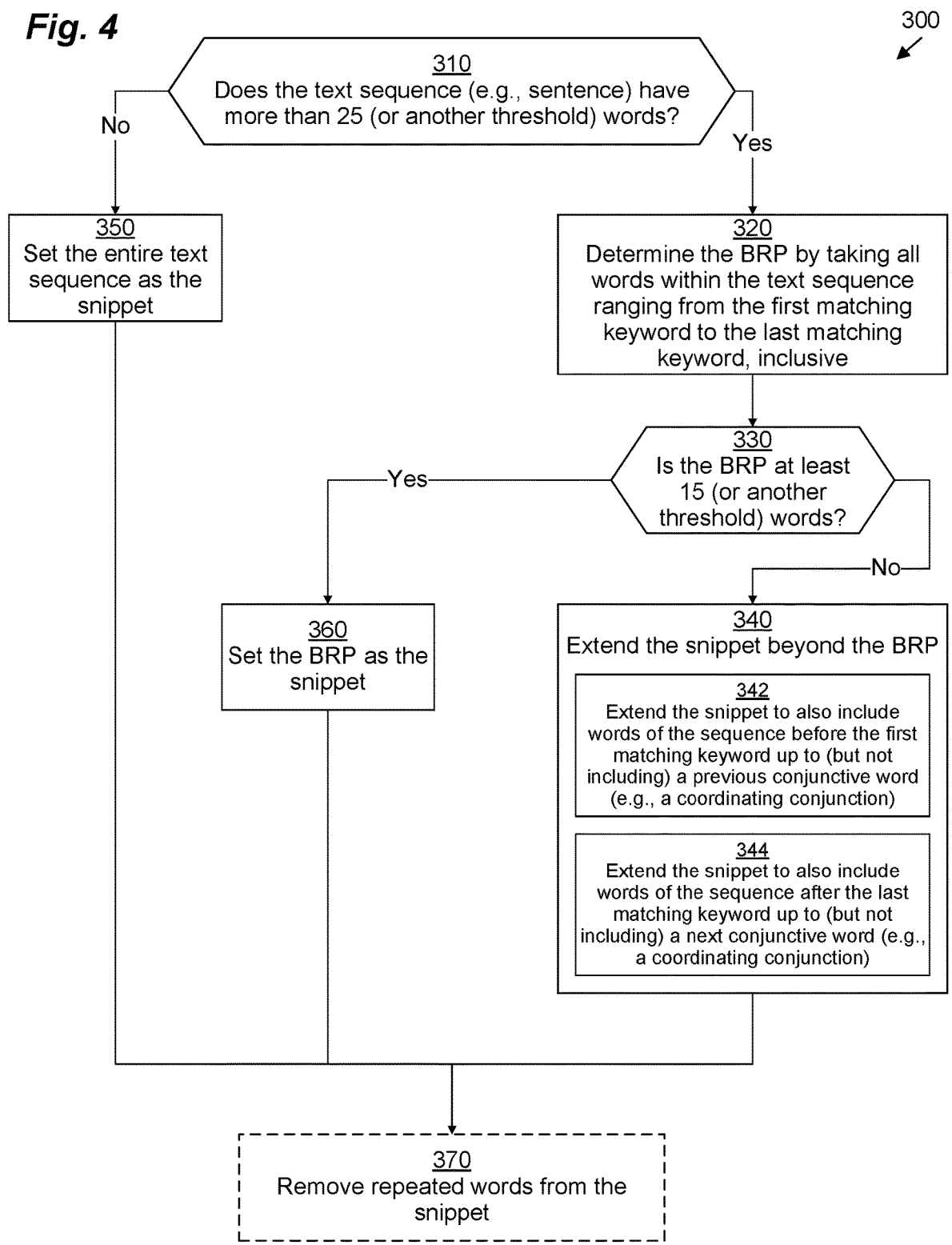
FIG. 4 is a flowchart depicting example methods according to various embodiments.

FIG. 4 depicts an example snippeting operation 300 in detail. Method 300 is performed by IAA 66 operating on a computing device 52. It should be understood that, in some embodiments, one or more of the steps or sub-steps may be omitted. Similarly, in some embodiments, one or more steps or sub-steps may be combined together or performed in a different order.

In step 310, IAA 66 determines whether or not the text sequence 50 has more than a threshold maximum number of words (e.g., more than 25 words). If it does not have more words, then it is not too long to allow the user 32 to easily perceive the gist of what was said. Thus, if it does not have more words, operation proceeds with step 350, in which IAA 66 sets the snippet to be the entire text sequence 50.

Figure 5:
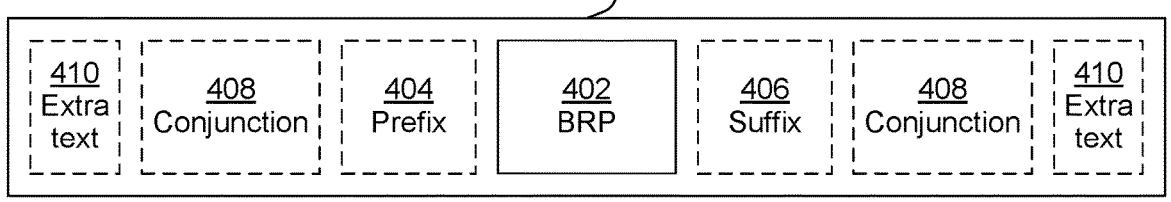
FIG. 5 is a block diagram depicting an example division of a text sequence in accordance with various embodiments.

However, if the text sequence 50 does have more than the threshold maximum number of words, then operation proceeds with step 320. The remaining steps of method 300 may best be understood with reference to FIG. 5, which depicts a text sequence 50 and an example sub-division of the text sequence 50.

In step 320, IAA 66 sets a base relevant phrase (BRP) 202 of the text sequence 50 to be a range of words within the sequence 50 from a first matching keyword of the rule 74 that generated it to a last matching keyword of the rule 74 that generated it. Thus, consider, for example, the following sentence, which has more than 25 words:

"I think that we may have had a productive meeting, and I therefore suggest that you should try installing this product to see if it serves your needs."

Applying example rule 74(a)(1) described above in connection with step 230, the BRP 202 of this example sentence is "suggest that you should."

In step 330, IAA 66 determines whether or not the BRP 202 has at least a threshold minimum number of words (e.g., at least 15 words). If it does, then the BRP 202 is likely long enough to suggest the gist of the text sequence 50 to the user, so operation proceeds with step 360 in which IAA 66 sets the snippet to be the BRP 202.

However, if the BRP is not at least as long as the threshold minimum length, then operation proceeds with step 340. In step 340, IAA 66 extends the snippet to include a prefix 204 and/or suffix 206 in addition to the BRP 202. In sub-step 342, IAA 66 extends the snippet to also include words of the sequence 50 before the first matching keyword up to (but not including) a previous conjunctive word or the beginning of the text sequence 50. In some embodiments, various types of conjunctions may be included or excluded. In one embodiment, only coordinating conjunctions (e.g., "for," "and," "nor," "but," "or," "yet," "so," etc.) are considered to the exclusion of subordinating conjunctions. Thus, since the word "and" is a conjunction, the prefix 204 of the example sentence is "I therefore."

In sub-step 344, IAA 66 extends the snippet to also include words of the sequence 50 after the last matching keyword up to (but not including) a next conjunctive word (again, including or excluding various types, based on the embodiment) or the end of the text sequence 50. Thus, since there are no conjunctions in the example sentence after the BRP 202, the suffix 206 of the example sentence is "try installing the product to see if it serves your needs." Thus, the extended snippet generated by step 340 for the example sentence is "I therefore suggest that you should try installing this product to see if it serves your needs."

As another example, applying rule 74(a)(2) to the example sentence, the BRP 202 would be "installing this product," while the prefix 204 is "I therefore suggest that you should try" and the suffix 206 is "to see if it serves your needs."

As another example, applying rule 74(b)(1) to the example sentence, the BRP 202 would be "I think," while the prefix 204 is null and the suffix 206 is "that we may have had a productive meeting."

It should be understood that there may be extra text 210 before and or after the snippet generated in step 340.

After steps 340, 350, or 360, operation may proceed to optional step 370, which may be performed in some embodiments. In step 370, IAA 66 removes repeated words from the snippet. Thus, for example, if the snippet is originally "I really really think that that that you may agree," after step 370 it would become "I really think that you may agree."

Figure 6:
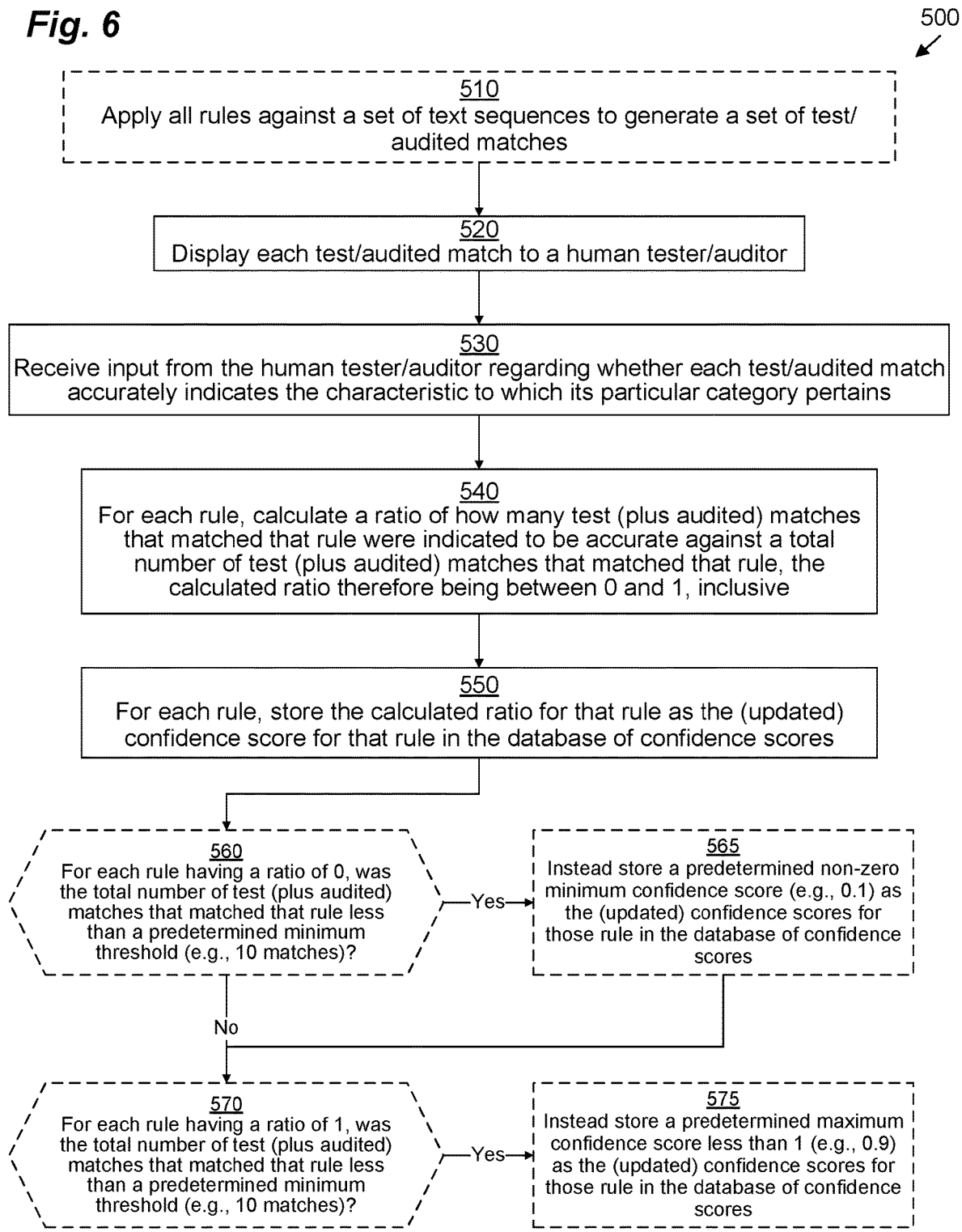
FIG. 6 is a flowchart depicting example methods according to various embodiments.

FIG. 6 depicts an example method 500 that may be used for creating or auditing the confidence score DB 76. Method 500 may be performed by IAA 66 or another application operating on a computing device 52. It should be understood that, in some embodiments, one or more of the steps or sub-steps may be omitted. Similarly, in some embodiments, one or more steps or sub-steps may be combined together or performed in a different order.

It should be understood that method 500 may be performed in order to initially generate the confidence score DB 76 or it may be performed to audit and update the confidence score DB 76 during operation of IAA 66. In the former case, method 500 operates on an initial set of text sequences 50 from any source (e.g., one or more previous interactions 42). In the latter case, method 500 performs in the background during operation of method 200 and operates on a set of audited matches drawn from matches 84 from operation of method 200.

Step 510 is performed if the rules 74 have not yet been applied against the set of text sequences 50. Typically, when done in the audit context, the rules 74 have already been applied to the set of text sequences to be audited, so step 510 is omitted. However, in the context of creating the confidence score DB 76 from scratch, step 510 is typically performed.

In step 510, computing device 52 applies all of the rules 74 of the set 72 against the set of text sequences (either the set of text sequences to be audited or a test set of text sequences) to generate a set of test matches or audited matches.

In step 520, computing device 52 displays each test match or audited match to a human tester or auditor on a display device 60 (or this may be done across network 38, such as over a web interface). This may include displaying text (possibly a snippet) of the text sequence 50 of test/audited match in conjunction with an indication of the characteristic to which the category associated with that match pertains.

In step 530, computing device 52 receives input from the human tester or auditor (either from UI circuitry 58 or network interface circuitry 54) with respect to each test match or audited match. The input indicates whether the text sequence 50 of each test/audited match accurately indicates the characteristic to which the category associated with that match pertains. Thus, for example, if the characteristic of the category is Next Steps and the text sequence 50 is "The install of the product was defective," then the human tester or auditor would likely indicate that the match did not accurately indicate its characteristic category.

Steps 520 and 530 may be performed either repeatedly or in parallel. Thus, in one embodiment, the human tester or auditor is presented with a long list of test/audited matches to evaluate, which he then evaluates and submits his input for all of them at once. In another embodiment, only one match is presented to the human tester or auditor at a time, the feedback is input, and then another match is displayed.

In step 540, for each rule 74(i)(j), the computing device 52 calculates a ratio of how many test or audited matches that matched that rule 74(i)(j) were indicated to be accurate against a total number of test or audited matches that matched that rule 74(i)(j). For example, if rule 74(a)(1) matched against twenty text sequences 50 and the human tester or auditor indicated that sixteen of those were accurate, then the calculated ratio would be 0.8. In some embodiments, the results from auditing may be combined with the results from the original testing to create an updated ratio. In such a case, the number of accurate audited matches may be added to a previous number of accurate test matches and then that sum may be divided by a sum of the total number of test matches plus audited matches.

In step 550, for each rule 74(i)(j), the computing device 52 stores the calculated ratio for that rule 74(i)(j) as the (updated) confidence score 80 for that rule 74(i)(j) in the confidence score DB 76.

In some embodiments, steps 560-575 may also be performed. In step 560, if a rule 74(i)(j) has a ratio of zero, then computing device 52 determines whether or not the total number of test/audited matches for that rule 74(i)(j) (i.e., the denominator of the unsimplified ratio) exceeds a predetermined minimum threshold (e.g., 10 matches). If not, then the sample size is too small for an accurate accounting, so operation proceeds with step 565, in which the computing device 52 replaces the confidence score 80 for that rule 74(i)(j) in the confidence score DB 76 with a predetermined non-zero minimum confidence score. This predetermined non-zero minimum confidence score may be, for example, in the range of 0.05 to 0.15 (e.g., 0.1). In either case, operation proceeds with step 570.

In step 570, if a rule 74(i)(j) has a ratio of one, then computing device 52 determines whether or not the total number of test/audited matches for that rule 74(i)(j) (i.e., the denominator of the unsimplified ratio) exceeds the predetermined minimum threshold (e.g., 10 matches). If not, then the sample size is too small for an accurate accounting, so operation proceeds with step 575, in which the computing device 52 replaces the confidence score 80 for that rule 74(i)(j) in the confidence score DB 76 with a predetermined maximum confidence score that is less than one. This predetermined maximum confidence score that is less than one may be, for example, in the range of 0.85 to 0.95 (e.g., 0.9).

Thus, improved techniques have been provided to allow a user 32 to interact with a computer 52 to automatically analyze a transcript 48 and provide interactive feedback pertaining to interactions 42 between the user 32 and other parties 36. This may be accomplished by dividing the transcript 48 into text sequences 50, such as sentences, and matching each text sequence 50 against a set 72 of rules 74 that define patterns that relate text sequences 50 to particular characteristic categorizations. These matches 84 can be further scored and ranked to allow particular text sequences 50 to be interactively displayed to the user 32 in response to selection of a particular categorization.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A computerized method of interactively communicating with a user to generate automated feedback pertaining to the user's interactions with other parties, the method comprising:
   obtaining a plurality of text sequences provided in a text transcription, the text transcription based on a recording of an interaction;
   matching each of the plurality of text sequences against a set of predetermined rules arranged across multiple predetermined categories to yield a set of matches, each rule specifying a respective set of text relationships that must be present in a text sequence to yield a match, each category pertaining to a particular characteristic of the interaction for which the rules in that category test to determine whether the sequence indicates the characteristic to which the category pertains, each match identifying:
      (a) a particular text sequence of the plurality of text sequences,
      (b) a particular category of the multiple predetermined categories, and
      (c) a particular rule which matched the particular text sequence;
   identifying confidence scores for the set of matches from a database of confidence scores, each confidence score reflecting a confidence that the particular text sequence identified by its respective match actually possesses the characteristic to which the particular category identified by that match pertains;
   for each unique sequence/category pairing, selecting a match that identifies that unique sequence/category pairing having a highest identified confidence score and assigning that highest identified confidence score to that unique sequence/category pairing;
   selecting a plurality of the unique sequence/category pairings for display based on their respective assigned confidence scores; and
   causing text of the sequences of each of the selected unique sequence/category pairings to be interactively displayed within an interactive graphical user interface (GUI) on a display device, including receiving, from the user, a selection of a particular category of the multiple categories for display and, in response, causing sequences indicated to possess the characteristic to which the selected category pertains to be displayed within the interactive GUI on the display device;
   wherein a rule of the set of predetermined rules specifies two words that must appear within a given proximity within a text sequence, the given proximity being within a range of 2 to 25 words; and
   wherein causing text of the sequences of each of the selected unique sequence/category pairings to be interactively displayed includes:
      selecting a snippet from the text sequence of each of the selected unique sequence/category pairings by automatically selecting all words of that selected unique sequence/category pairing appearing within that text sequence between the two specified words, inclusive, including:
         determining that a number of words appearing between the two specified words does not exceed a threshold; and
         selectively extending the snippet beyond the two specified words in response to determining that the number of words appearing between the two specified words does not exceed the threshold, including:
            extending the snippet to also include words of the sequence before a first of the two specified words up to a previous conjunctive word; and
            extending the snippet to also include words of the sequence after a last of the two specified words up to a next conjunctive word; and
      issuing instructions directing the selected snippet of the sequences of each of the selected unique sequence/category pairings to be automatically displayed to the exclusion of a remainder of each sequence.

2. The method of claim 1 wherein the rule of the set of rules specifies a negative word, the negative word not being permitted to appear within another given proximity of the two specified words, the other given proximity being within a range of 1 to 2 words.

3. The method of claim 1 wherein the method further comprises generating the database of confidence scores by:
   matching a set of test text sequences against the set of predetermined rules arranged across the multiple predetermined categories, thereby generating a set of test matches, each test match identifying the particular rule and category to which it matches;
   displaying the set of test matches to a human tester;
   receiving input from the human tester regarding whether each test match of the set of test matches accurately indicates the characteristic to which its particular category pertains;
   for each rule of the set of predetermined rules, calculating a ratio of how many test matches of the set of test matches that matched that rule were indicated to be accurate against a total number of test matches of the set of test matches that matched that rule, the calculated ratio therefore being between 0 and 1, inclusive; and
   for each rule of the set of predetermined rules, storing the calculated ratio for that rule as the confidence score for that rule in the database of confidence scores.

4. The method of claim 2 wherein generating the database of confidence scores further includes:
   for each rule of the set of predetermined rules having a confidence score of 0:
      testing whether the total number of test matches of the set of test matches that matched that rule is less than a predetermined minimum threshold; and
      for each rule for which testing yielded a result indicating that the total number of test matches of the set of test matches that matched that rule is less than the predetermined minimum threshold, storing a predetermined non-zero minimum confidence score as the confidence score for that rule in the database of confidence scores; and
   for each rule of the set of predetermined rules having a confidence score of 1:
      testing whether the total number of test matches of the set of test matches that matched that rule is less than the predetermined minimum threshold; and
      for each rule for which testing yielded a result indicating that the total number of test matches of the set of test matches that matched that rule is less than the predetermined minimum threshold, storing a predetermined maximum confidence score less than 1 as the confidence score for that rule in the database of confidence scores.

5. The method of claim 4 wherein:
the predetermined non-zero minimum confidence score is within a range of 0.05 to 0.15; and
the predetermined maximum confidence score is within a range of 0.85 to 0.95.

6. The method of claim 2 wherein the method further comprises updating the confidence database in real-time by:
auditing a portion of the plurality of text sequences, each audited text sequence having a set of audited matches;
displaying the audited matches to a human auditor;
receiving input from the human auditor regarding whether each audited match accurately indicates the characteristic to which its particular category pertains; and
updating the stored confidence score for rules in the database using the received input from the human auditor.

7. The method of claim 1 wherein selecting includes choosing all sequence/category pairings having an assigned confidence score that exceeds a predetermined threshold minimum.

8. The method of claim 1 wherein selecting includes choosing, for each category of the multiple predetermined categories, sequence/category pairings having highest assigned confidence scores up to a predetermined maximum number of selections.

9. The method of claim 1
wherein the method further comprises, for each category of the multiple predetermined categories, ranking the selected plurality of sequence/category pairings in order from highest assigned confidence score to lowest assigned confidence score; and
wherein causing sequences indicated to possess the characteristic to which the selected category pertains to be displayed within the interactive GUI on the display device includes displaying text of the selected plurality of sequence/category pairings for that selected category in the ranked order.

10. The method of claim 1 wherein the method is performed in response to receiving a request from the user to interactively view the automated feedback.

11. The method of claim 1 wherein causing text of the sequences of each of the selected unique sequence/category pairings to be interactively displayed within the interactive GUI on the display device includes sending browser-interpretable code over a network to a web browser executing on a remote machine operated by the user.

12. A computer program product comprising a non-transitory computer-readable storage medium storing a set of instructions, which, when executed by a computing device, cause the computing device to interactively communicate with a user to generate automated feedback pertaining to the user's interactions with other parties by:
obtaining a plurality of text sequences provided in a text transcription, the text transcription based on a recording of an interaction;
matching each of the plurality of text sequences against a set of predetermined rules arranged across multiple predetermined categories to yield a set of matches, each rule specifying a respective set of text relationships that must be present in a text sequence to yield a match, each category pertaining to a particular characteristic of the interaction for which the rules in that category test to determine whether the sequence indicates the characteristic to which the category pertains, each match identifying:
(a) a particular text sequence of the plurality of text sequences,
(b) a particular category of the multiple predetermined categories, and
(c) a particular rule which matched the particular text sequence;
identifying confidence scores for the set of matches from a database of confidence scores, each confidence score reflecting a confidence that the particular text sequence identified by its respective match actually possesses the characteristic to which the particular category identified by that match pertains;
for each unique sequence/category pairing, selecting a match that identifies that unique sequence/category pairing having a highest identified confidence score and assigning that highest identified confidence score to that unique sequence/category pairing;
selecting a plurality of the unique sequence/category pairings for display based on their respective assigned confidence scores; and
causing text of the sequences of each of the selected unique sequence/category pairings to be interactively displayed within an interactive graphical user interface (GUI) on a display device, including receiving, from the user, a selection of a particular category of the multiple categories for display and, in response, causing sequences indicated to possess the characteristic to which the selected category pertains to be displayed within the interactive GUI on the display device;
wherein a rule of the set of predetermined rules specifies two words that must appear within a given proximity within a text sequence, the given proximity being within a range of 2 to 25 words; and
wherein causing text of the sequences of each of the selected unique sequence/category pairings to be interactively displayed includes:
selecting a snippet from the text sequence of each of the selected unique sequence/category pairings by automatically selecting all words of that selected unique sequence/category pairing appearing within that text sequence between the two specified words, inclusive, including:
determining that a number of words appearing between the two specified words does not exceed a threshold; and
selectively extending the snippet beyond the two specified words in response to determining that the number of words appearing between the two specified words does not exceed the threshold, including:
extending the snippet to also include words of the sequence before a first of the two specified words up to a previous conjunctive word; and
extending the snippet to also include words of the sequence after a last of the two specified words up to a next conjunctive word; and
issuing instructions directing the selected snippet of the sequences of each of the selected unique sequence/category pairings to be automatically displayed to the exclusion of a remainder of each sequence.

13. An apparatus comprising processing circuitry coupled to memory configured to cause the computing device to interactively communicate with a user to generate automated feedback pertaining to the user's interactions with other parties by:
obtaining a plurality of text sequences provided in a text transcription, the text transcription based on a recording of an interaction;

matching each of the plurality of text sequences against a set of predetermined rules arranged across multiple predetermined categories to yield a set of matches, each rule specifying a respective set of text relationships that must be present in a text sequence to yield a match, each category pertaining to a particular characteristic of the interaction for which the rules in that category test to determine whether the sequence indicates the characteristic to which the category pertains, each match identifying:
   (a) a particular text sequence of the plurality of text sequences,
   (b) a particular category of the multiple predetermined categories, and
   (c) a particular rule which matched the particular text sequence;
identifying confidence scores for the set of matches from a database of confidence scores, each confidence score reflecting a confidence that the particular text sequence identified by its respective match actually possesses the characteristic to which the particular category identified by that match pertains;
for each unique sequence/category pairing, selecting a match that identifies that unique sequence/category pairing having a highest identified confidence score and assigning that highest identified confidence score to that unique sequence/category pairing;
selecting a plurality of the unique sequence/category pairings for display based on their respective assigned confidence scores; and
causing text of the sequences of each of the selected unique sequence/category pairings to be interactively displayed within an interactive graphical user interface (GUI) on a display device, including receiving, from the user, a selection of a particular category of the multiple categories for display and, in response, causing sequences indicated to possess the characteristic to which the selected category pertains to be displayed within the interactive GUI on the display device;
wherein a rule of the set of predetermined rules specifies two words that must appear within a given proximity within a text sequence, the given proximity being within a range of 2 to 25 words; and wherein causing text of the sequences of each of the selected unique sequence/category pairings to be interactively displayed includes:
   selecting a snippet from the text sequence of each of the selected unique sequence/category pairings by automatically selecting all words of that selected unique sequence/category pairing appearing within that text sequence between the two specified words, inclusive, including:
      determining that a number of words appearing between the two specified words does not exceed a threshold; and
      selectively extending the snippet beyond the two specified words in response to determining that the number of words appearing between the two specified words does not exceed the threshold, including:
         extending the snippet to also include words of the sequence before a first of the two specified words up to a previous conjunctive word; and
         extending the snippet to also include words of the sequence after a last of the two specified words up to a next conjunctive word; and
   issuing instructions directing the selected snippet of the sequences of each of the selected unique sequence/category pairings to be automatically displayed to the exclusion of a remainder of each sequence.

14. The method of claim 1 wherein:
each text sequence of the plurality of text sequences includes more than one word: and
for each rule, the set of text relationships that must be present in the text sequence to yield a match for that rule include text relationships that require at least two words in the text sequence.

15. The method of claim 1 wherein causing text of the sequences of each of the selected unique sequence/category pairings to be interactively displayed within the interactive GUI on the display device includes excluding sequences not indicated to possess the characteristic to which the selected category pertains from being displayed within the interactive GUI on the display device.

* * * * *